United States Patent
Weissman et al.

(10) Patent No.: US 7,675,684 B1
(45) Date of Patent: Mar. 9, 2010

(54) COMPACT OPTICAL SYSTEM

(75) Inventors: Paul Weissman, Brewster, NY (US); Minoo Bablani, Reston, VA (US)

(73) Assignee: NVIS Inc., Reston, VA (US)

( * ) Notice: Subject to any disclaimer, the term of this patent is extended or adjusted under 35 U.S.C. 154(b) by 83 days.

(21) Appl. No.: 12/217,905

(22) Filed: Jul. 9, 2008

Related U.S. Application Data

(60) Provisional application No. 60/958,844, filed on Jul. 9, 2007.

(51) Int. Cl.
*G02B 27/14* (2006.01)

(52) U.S. Cl. .................. 359/630; 359/633

(58) Field of Classification Search .................. 359/629, 359/630, 633; 345/7, 8; 353/28
See application file for complete search history.

(56) References Cited

U.S. PATENT DOCUMENTS 7,397,607 B2 * 7/2008 Travers .................. 359/630

\* cited by examiner

*Primary Examiner*—Jack Dinh
(74) *Attorney, Agent, or Firm*—Gerow D. Brill

(57) ABSTRACT

The invention relates to compact optical arrangement for a helmet mounted display. The arrangement is well suited to use with spatial light modulators which require front illumination such as LCoS modulators but can also be adapted to rear illuminated devices such as LCD's and to self luminous devices such as OLEDs. The device uses polarization and reflection to make dual use of both volumes and lenses.

6 Claims, 8 Drawing Sheets

COMPACT OPTICAL SYSTEM

CROSS REFERENCE

This application is related to provisional application Ser. No. 60/958,844 filed on Jul. 9, 2007 entitled "Design of a See-through Head-Mounted Display" and is hereby incorporated herein by reference.

FIELD OF THE INVENTION

The present invention relates to compound optical pupil forming systems. In particular, the invention relates to reducing the volume of an optical system by using a plurality of optical components multiple times.

BACKGROUND OF THE INVENTION

There is an increased interest in using miniature image devices carried on the head of an observer, head-mounted displays (HMD), to present information to the observer in a dynamic mode. The image device cannot be viewed directly, when placed before the observer's eye, due to the closeness of the device to the observer. Optical elements are used to create a virtual image of the image device at some distance so as to be comfortably viewed by the observer. One of the challenges of building such a device is to make the optical elements compact while maintaining optical performance that will support the resolution of the imaging device. While some applications having a modest field of view that can be supported by magnifier viewer wider field of view devices using small miniature image devices, they require compound optical systems. Compound optical systems that preserve a direct view of the image source are commonly known as pupil forming systems.

The present disclosure relates to compound optical pupil forming systems. Such devices are more fully described by Shenker in U.S. Pat. No. 3,432,219 ('219), hereby incorporated herein by reference. The devices in the '219 patent consist of two main parts, a relay lens and an eyepiece lens combined to form an erecting eyepiece.

As illustrated herein by FIG. 1, Chen et al discloses in U.S. Pat. No. 5,822,127 ('127), hereby incorporated by reference, the form configured for a helmet display, 100. The light path begins at the image plane (102) and is relayed by (104, 104a, 104b) forming a real image near a fold mirror (106). The light is then collimated by (108, 108a) and is observed by the eye (122) at the conjugate pupil (120). When the image plane is a reflective display, additional optics are required for illuminating the display.

A typical illumination arrangement is illustrated, by Weissman et al., in U.S. Pat. No. 5,984,477 ('477) in FIG. 2 (FIG. 1 in the '477 patent). The '477 patent is hereby incorporated by reference.

Referring to FIG. 2 from Weissman et al., a system 200 includes having an image formed on the spatial light modulator (SLM) 202, is a ferroelectric liquid crystal (FLC) device, and is projected onto the rear projection screen 204 by the lens assembly 206. The SLM 202 is illuminated by light source 208, which is focused onto the SLM 202 by lenses 210, 212 and 214 via polarizing cube beam splitter (PBS) 216. The light source 208 may comprise a lamp or an optic fiber cable relaying light from a lamp to lens 210. The lenses 210, 212 and 214 results in a low numerical aperture, collimated beam which is directed normally onto the SLM 202.

The polarizing cube beam splitter 216 reflects light polarized in one direction and transmits light polarized in the orthogonal direction. Light impinging on a pixel in the OFF state is reflected back with the same polarization and re-enters the illumination system via lenses 214, 212 and 210. Light impinging on a pixel in the ON state is reflected back with its plane of polarization rotated 90 degrees, and is, therefore, transmitted by the polarizing beam splitter toward the rear projection screen 204. Ferroelectric liquid crystal devices and their operation are known in the art.

Polarizers 218 and 220 serve to reduce unwanted light reaching the rear projection screen 204 and consequently increase the contrast of the image. The first polarizer reduces the amount of light entering the cube 216; however, substantially all of the polarized light entering the cube is reflected by the polarized reflective surface inside cube 216. Although the reflective surface is fully reflective (and not half reflective) for polarized light, the term "beam splitter" is used since splits non-polarized beams into polarized beams.

The image on the rear projection screen 204 is viewed through the cube eyepiece shown generally at 222 by an observer placing his or her eye at viewpoint 224. The basic eyepiece is formed by beam splitter 226 and the spherical mirror 228 which serves to create a magnified virtual image of the rear projection screen 204 at a relatively large distance from the observer. Lenses 230 and 232 provide color correction while lens 234 helps to achieve uniform brightness at the normal viewing position.

FIG. 3 illustrates an embodiment described in U.S. Pat. No. 5,596,451 ('451) by Handschy et al. that illustrates how a cube beam splitter may utilize all 4 sides in an optical design.

Illustrated as assembly 300 of FIG. 3 herein, assembly 300 includes illumination arrangement 302, spatial light modulator 304, and an optics arrangement 306. The optics arrangement 306 includes a first member, specifically a mirror 308 having a curved light reflecting surface 310 which are configured to, in cooperation with other members of optics arrangement 306, direct light into a predetermined area 312. Optics arrangement 306 also includes a second member, which in this embodiment is a polarizer-analyzer beam splitting cube 314, hereinafter referred to as polarizing beam splitting cube 314, having a plurality of external surfaces or faces. The illumination arrangement 302 is positioned in proximity to and in optical communication with a first external face 316 of cube 314. If illumination arrangement 302 produces light which is not polarized, an auxiliary polarizer 318 is positioned between illumination arrangement 302 and face 318 of cube 314. Illumination arrangement 302 can be readily removably attached adjacent to face 318 of cube 312 to allow for replacement or repair of this component, as indicated generally at 320. Also, spatial light modulator 304 is positioned in proximity to and in optical communication with a second external face 322 of cube 314 and mirror 308 is positioned in proximity to a third face 324 of cube 314 and a quarter wave plate 326 is positioned between mirror 308 and face 324 of cube 48. In this preferred embodiment of the present invention, mirror 308 and/or spatial light modulator 304 are readily adjustably attached adjacent to face 322 and/or face 324, respectively, as indicated generally at 328. This arrangement allows the distance between mirror 308 and face 324 of cube 314 and/or the distance between spatial light modulator 304 and face 322 of cube 314 to be adjusted within a predetermined range of distances thereby providing means for focusing the image generated by the assembly.

Polarizing beam splitting cube 314 includes a polarizing beam splitting film or layer 330 positioned within cube 314 such that one side of film 330 faces external faces 316 and 322 of cube 314, and the other side of film 300 faces external face 324 and a fourth external face 332 of cube 314. As indicated by lines 334 and 336, which represent light provided by illumination arrangement 302, light produced by illumination arrangement 302 is linearly polarized by auxiliary polarizer 318 such that S-polarized light is directed into film 330 within cube 314. It is to be understood that fines 334 and 336 and all other lines subsequently used to trace light through the assemblies are illustrative only and are not intended to represent a ray trace as is commonly performed in the course of an optical design. It is also to be understood that the term S-polarized light is used in the common manner wherein it specifies that the electric vector of the light incident on a reflective surface is perpendicular to the plane of incidence, in this case the plane of the drawing.

Since film 330 is a polarizing beam splitting film, the majority of the S-polarized light 332 is directed into spatial light modulator 304. Spatial light modulator 304 is a reflective spatial light modulator having a reflective surface and a light modulating medium, in this case a ferroelectric liquid crystal layer, which is switchable between different states. The reflective surface and the modulating medium cooperate to act on light in ways that form an overall pattern of reflected, modulated light, which constitutes a modulation encoding of a picture which may be viewed. For this embodiment, the S-polarized light which is directed into spatial light modulator 304 is modulated by the ferroelectric liquid crystal material such that the overall pattern of reflected, modulated light is a pattern of light of S-polarized light and P-polarized light which is orthogonally polarized to the S-polarized light. At any point in this pattern, the polarization depends on the state of the corresponding pixilated portions of the ferroelectric liquid crystal material through which the S-polarized light from illumination arrangement 302 has passed. Spatial light modulator 304 directs this modulated light back into cube 314 where the light is analyzed by polarizing beam splitting film 330, as will be described immediately below.

The purpose of analyzing the pattern is to decode the polarization modulated pattern and transform it into a brightness modulated pattern which can be viewed and recognized as a display image. As indicated by line 336, the S-polarized light from illumination arrangement 302 which spatial light modulator does not change, and therefore remains S-polarized light, is directed back toward illumination arrangement 302. As indicated by line 334, the S-polarized light from illumination arrangement 302 which spatial light modulator changes to P-polarized light passes through film 330 and is directed toward mirror 308 through quarter wave plate 326. Mirror 308 reflects light 334 back through quarter wave plate 326 which, since light 334 has passed through quarter wave plate 326 twice, changes light 334 back to S-polarized light. And finally, polarizing beam splitting film 330 directs this S-polarized light out of cube 314 through external face 332 into area 312 which extends outwardly from face 332.

The components of the above described arrangement are mutually disposed and the curvature of mirror 308, which in this case is a magnifying mirror, is established so as to produce a viewable magnified image of the pattern of modulated light created at and by spatial light modulator 304. This image is viewable when a viewer places an eye within viewing area 46 which extends outward from the fourth face 66 of cube 48 and when the eye is directed generally toward face 322 of the cube. This viewable image is made luminous by light from illumination arrangement 302 as modulated by the polarization control affected by spatial light modulator 304 in cooperation with polarizing beam splitter film 330 and auxiliary polarizer 318, if included.

While the prior art completes the task of forming a virtual collimated image for a helmet display optical system the components are spread out over a physical large area. Additionally, components such as the polarizing cube beam splitter 216 in the Weissman '477 patent are not used to full advantage as only three of the four available sides are utilized in the optical design. The majority of the lens elements are also used one time. There is a need for a compact optical with its total length, width and height significantly shorter than its optical path.

SUMMARY OF THE INVENTION

This disclosure provides a novel method of making use of optical elements several times thus reducing the number of elements required for the task of forming a virtual image while at the same time reducing the volume required to complete the same task by doubling back through the space the elements occupy.

The claimed invention includes a basic system and four exemplary embodiments. The basic principle of the disclosure is a compact pupil forming optical system where a sum of a length, a width and a height of the optical system is less than an optical path length traversing through or reflecting from a plurality of elements of the optical system. Such a system has a plurality of elements including: a light source; an illumination lens; one or more polarizers; one or more transmitting/reflecting polarizing device(s); a spatial light modulator; one more relay lens(es); one or more first surface or Mangin mirrors; an eyepiece; and having a real external exit pupil from which a virtual image is observed. The optical system uses linearly polarized light outside the one or more relay lenses and circularly polarized light within the one or more relay lenses, or a portion of the one or more relay lenses, thus enabling different optical paths for light entering and exiting the one or more relay lenses.

A first optical system includes a light source emitting light that passes through an illumination lens; then the light is polarized by the first linear polarizer; and the polarized light then is incident on transmitting/reflecting polarizing device. A portion of the polarized light is reflected by the transmitting/reflecting polarizing device and is then incident on a spatial light modulator where it is accepted, reflected, and coded by the spatial light modulator on a pixel by pixel basis and exits the spatial light modulator as a first or a second portion of linearly polarized light. The coded light returns to the transmitting/reflecting polarization device where the second portion of polarized light passes through the transmitting/reflecting polarizing device.

The second portion of linearly polarized light continues to the second polarizer, a ¼ wave retarder, which circularly polarizes the second portion of light. A second portion of circularly polarized light passes through the second relay lens and is incident on a Mangin/reflecting surface. The Mangin/reflecting surface directs the second portion of circularly polarized light back through the ¼ wave retarder a second time which causes a polarization phase shift of 90 degrees, thus the second portion of light is returned to linearly polarized light.

The second portion of linearly polarized light is then passed again to the transmitting/reflecting polarizing device and is reflected by the transmitting/reflecting polarizing device towards and is received by the eyepiece and thus observed by an eye in the viewing area.

The second portion of polarized light is "s" polarized light. In a sub-embodiment of the optical system the second portion of polarized light is "p" polarized light.

The polarizing transmission/reflecting device may be a polarizing coated flat plate or a polarizing beam splitter cube.

Four exemplary embodiments of the disclosure create various optical systems using the principles and methods described above.

BRIEF DESCRIPTION OF THE FIGURES

These and other features, aspects, and advantages of the present disclosure will become better understood with regard to the following description, appended claims, and accompanying drawing where:

DETAILED DESCRIPTION

This disclosure relates to reducing the volume of an optical system by using optical components multiple times and using the compact optical system within a head-mounted display or other applications requiring a compact system with a long optical path. The schematic arrangement of an optical display constructed in accordance with the disclosure is illustrated as system 400 in FIG. 4.

The system forms a virtual image which is viewed from an external position. The system consists of 4 components or subsystems; 1) an illumination system; 2) a spatial light modulator (SLM); 3) a reflective relay system; 4) a viewing eyepiece. It is the purpose of the illumination system to illuminate the SLM. A real image is formed on the surface of the SLM. The relay lens system reforms an aerial image of the real image. The aerial image is then collimated by the eyepiece, becoming a virtual image. The virtual image is then observed by the eye of an observer.

Within such an optical system, polarization is a primary element to be used and applied correctly. Polarized light has application in many fields. As a result several (successful) representations of polarized light have been developed. In the descriptions of our invention we designate an appreciably linearly polarized light state as either "s" or "p". The said two states are orthogonal to each other and orthogonal to the propagation vector of the light. Any linearly polarizing surface can be oriented in such a manner with respect to the propagation vector of the light as to appreciably absorb, appreciably reflect, or appreciably transmit either "s" or "p". In FIGS. 4-8, a double-headed filled arrow represents either "s" or "p" and a single-headed unfilled arrow represents propagation vector of light.

Figure 1:
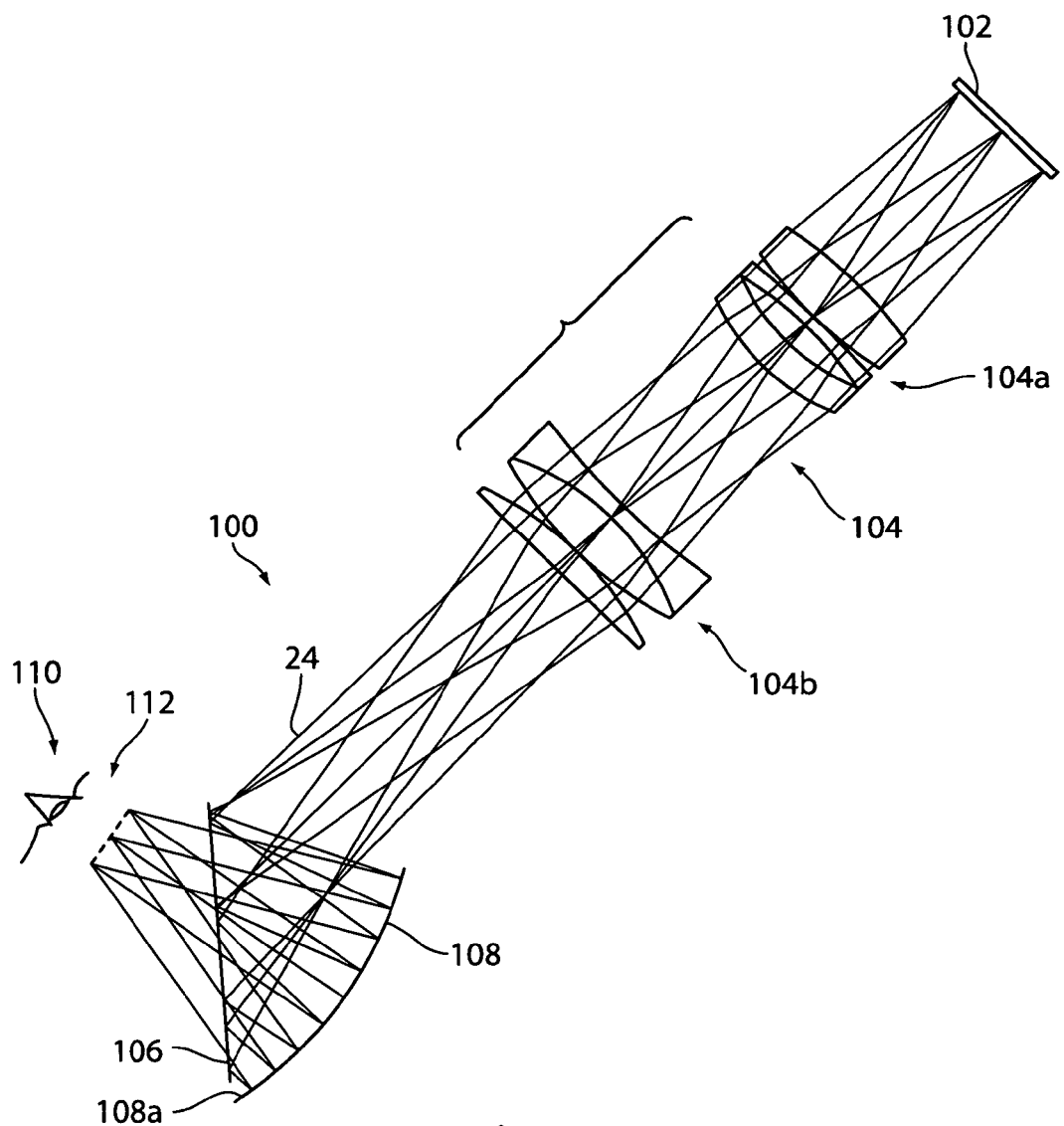
FIG. 1 illustrates a device described by Shenker in U.S. Pat. No. 3,432,219.
Figure 2:
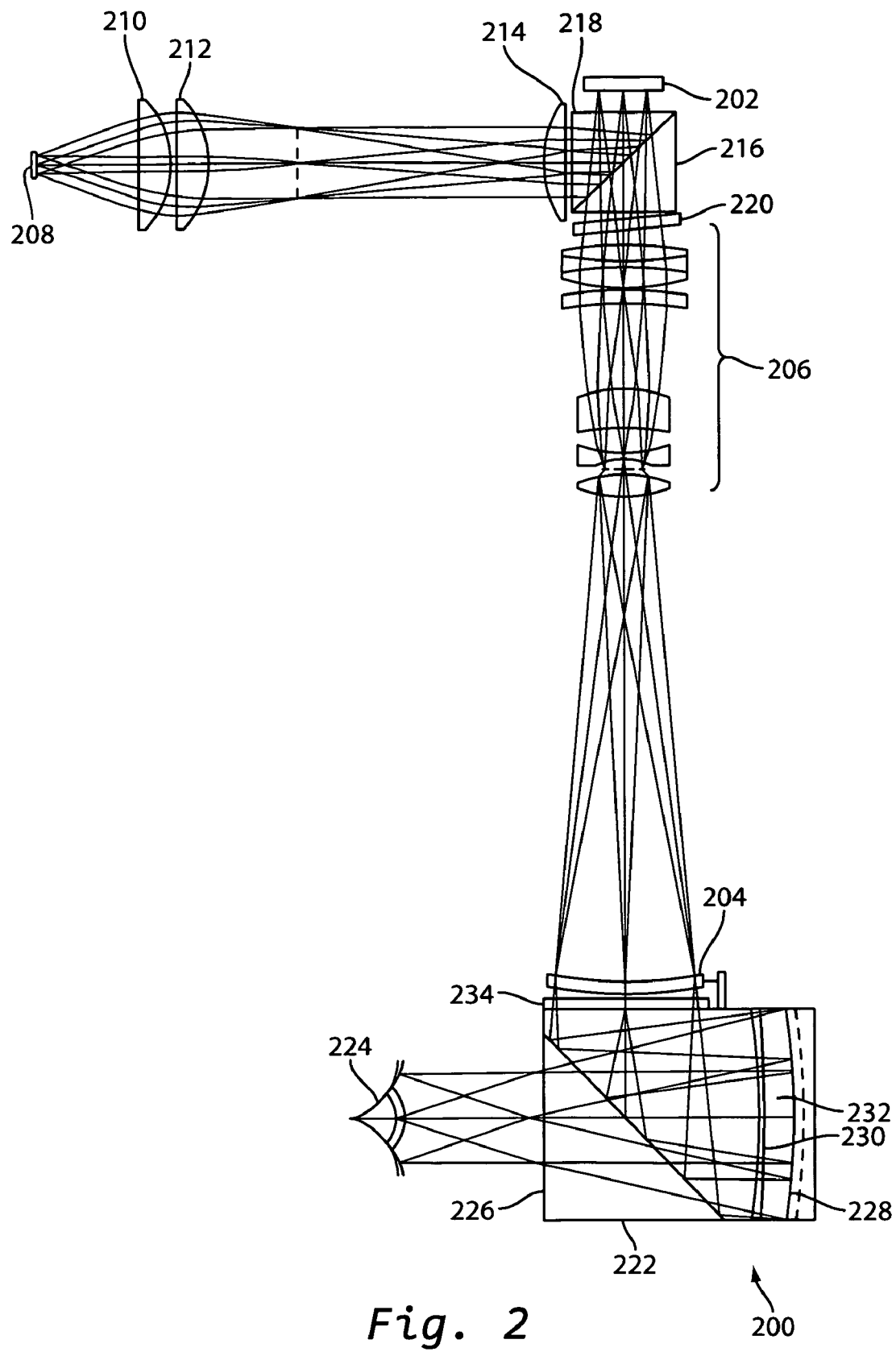
FIG. 2 is an illumination arrangement as illustrated, by Weissman, in U.S. Pat. No. 5,984,477.
Figure 3:
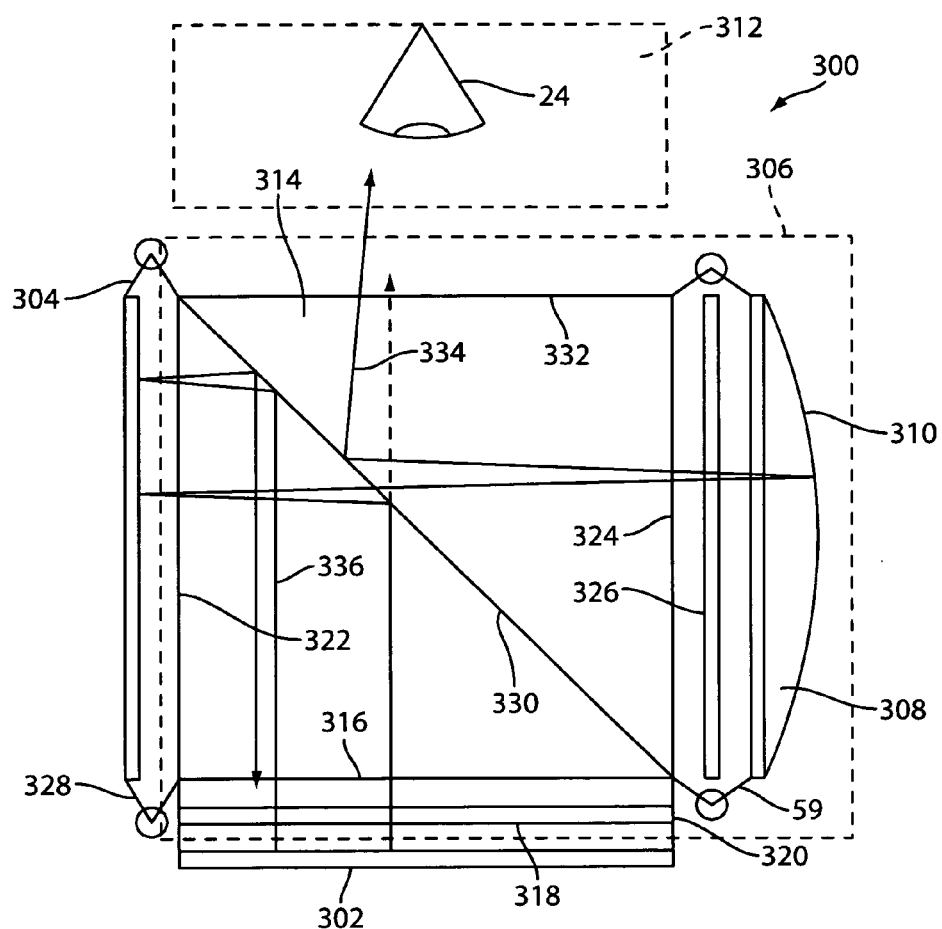
FIG. 3 illustrates how a cube beam splitter may utilize all four sides in an optical design as described in U.S. Pat. No. 5,596,451 by Handschy et al.
Figure 4:
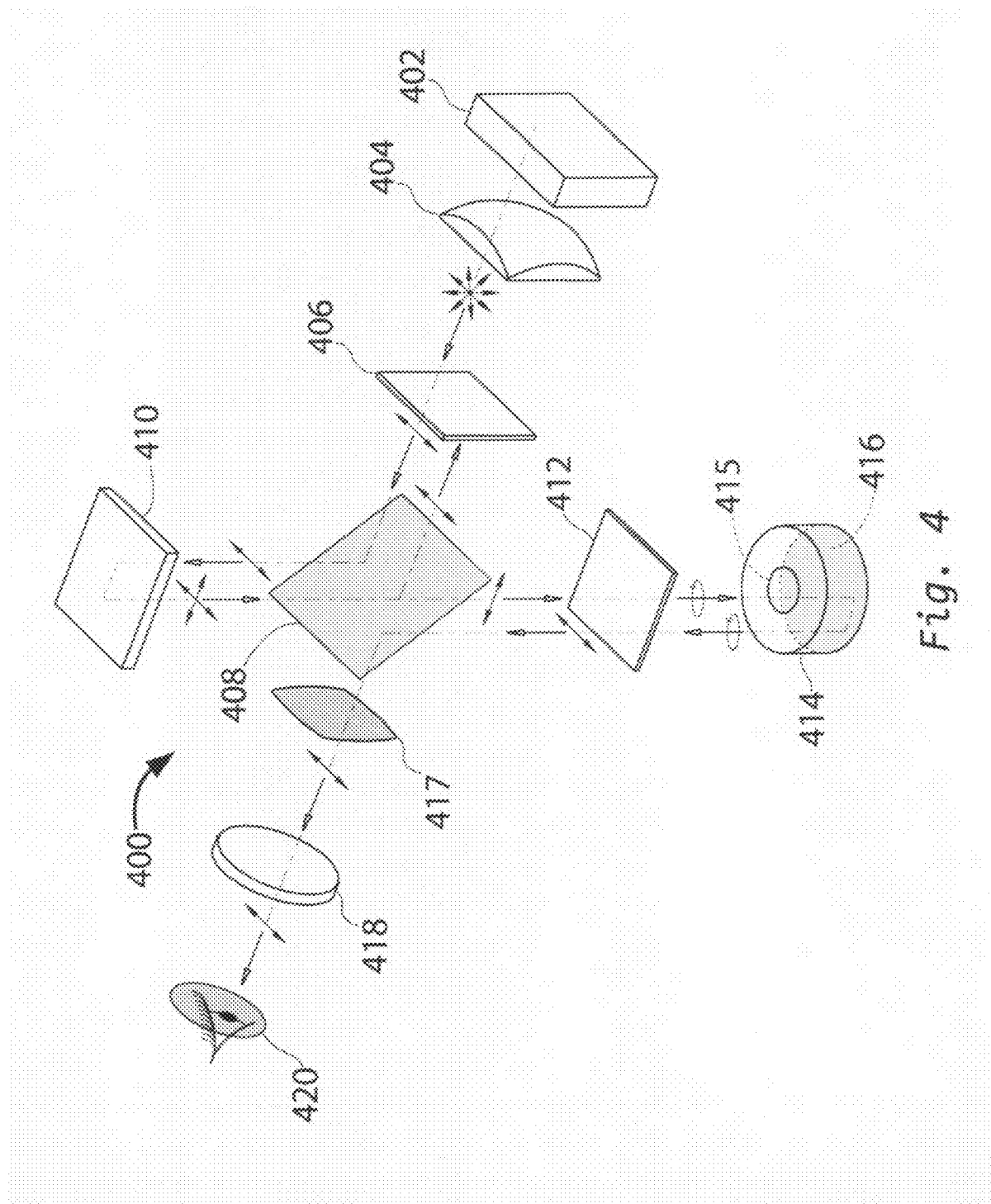
FIG. 4 is a schematic representation of the claimed system.

Schematically, the claimed system 400 as illustrated in FIG. 4 includes a light source 402 emitting light that passes through an illumination lens 404. The light is then "s" polarized by a linear polarizer 406. The "s" light enters a transmitting/reflecting polarizing device 408 and is incident on the first surface of a transmitting/reflecting polarizing device 408. The polarizing surface of transmitting/reflecting polarizing device 408 is such that the "s" light is reflected by the surface and "p" light is transmitted by the surface. The reflected "s" light is then incident on a SLM 410. The "s" light is accepted, reflected, and coded by the SLM 410 on a pixel by pixel basis forming an image. The light from each pixel exits SLM 410 as "s" or "p" polarized light depending on the electrically switched state of each pixel. The light then returns to the transmitting/reflecting polarizing device 408. The "s" polarized portion of the light is reflected back to the source while a "p" polarized portion of the light passes through the transmitting/reflecting polarizing device 408 and continues to a ¼ wave retarder 412 which circularly polarizes the incident linearly polarized light with preference to handedness (right-handedness or clockwise, left-handedness or counter-clockwise). The light then enters a relay lens 414 forming internal pupil 415 within the relay lens 414. Then the circularly polarized light is reflected by a mirror 416 that reverses the direction of light and reverses the handedness of the circular polarization. The light travels back through the relay lens 414, and passes through the ¼ wave retarder 412 which now converts the circularly polarized light into "s" linearly polarized light. The "s" polarized light is then reflected by the second surface of the transmitting/reflecting polarizing device 408 and an aerial image 417 is formed. Eyepiece 418 is placed such that it forms a real exit pupil 420, which is a real image of the internal pupil 415, while collimating an aerial image 417 at a comfortable viewing distance from real exit pupil 420.

The illumination system can be as simple as an extended diffused light source or it can be a combination of a light source and a single or multiple lens system. The linear polarizer element can be an integral part of the light source or can be a separate external element placed before the light is incident on transmitting/reflecting polarizing device 408. The illumination system must fill the SLM 410 with polarized light and impart the correct angles to the incident light such that the SLM 410 appears to be illuminated from all points within the real exit pupil 420.

When the SLM 410 is a Ferroelectric Liquid Crystal Display (FLCD) the pixels are coded in both the time and color domain. When coded this way the switching is done at a high rate for gray scale and at least 3 times per frame rate for Red, Green, and Blue colors. In the past rotating color filter wheels were synchronized to the red, green and blue video frames and while this has worked with HMDs the bulk and complexity become problematic. The next advance was electro-optical color switches such as those manufactured by Color Link in Colorado that use color selective polarization switching to synchronize the color to the video frame. Currently red green and blue LED's are switched in synchronization to the video frames. Devices such as the Alphalight manufactured by Teledyne and the OSTAR manufactured by Osram are used to illuminate the field sequential SLMs. The first use of the transmitting/reflecting polarizing device 408 is to direct the light from the source to the SLM 410. The transmitting/reflecting polarizing device 408 is also used to de-code the image formed on the SLM 410 and to direct the light to the relay lens 414 and again to direct the light exiting the relay lens 414 towards the eyepiece 418. Since the output of the transmitting/reflecting polarizing device 408 viewed by the eyepiece 418 is opposite the side facing the light source, the efficiency of the polarizing surface of the transmitting/reflecting polarizing device 408 must be very high else the light source will be directly viewed by the observer at the real exit pupil 420 thus reducing the contrast of the image. To improve or maximize the image-contrast, the transmitting/reflecting polarizing device 408 must reflect all or as much as possible the linearly polarized light coming from the light source, toward the SLM 410.

The function of the transmitting/reflecting polarizing device 408 can be achieved in various ways. Polarizing beam splitter (PBS) cubes suitable for the purpose are manufactured by Foreal Spectrum and by Unaxis Optics. A suitable PBS is manufactured using a Moxtek, Orem Utah, product called Proflux by bonding two Proflux wire grid polarizers together with the wire grids parallel and with a linear sheet polarizer between the two Proflux elements. The sheet polarizer is oriented to pass the polarization state nominally passed by the Proflux elements and absorb the state nominally reflected by the Proflux elements. Proflux is a transmitting/reflecting polarizing device meaning that randomly polarized light incident will be transmitted linearly polarized and reflected linearly polarized with an axis ninety degrees from the transmitted vector. Another structure that can polarize light in a similar way has been developed by Rolic in Switzerland. In this device photo alignment is used to align a liquid crystal structure after which the structure is solidified resulting in a transmitting/reflecting polarizing device. Still another method has been developed by 3M and is sold under the trade name of DEBAF. The 3M material uses the effect of bi-refringent and uniform index materials combined with Fresnel reflection to form a transmitting/reflecting polarizing device. PBS cubes can be made from any of these materials with varying results.

Before being incident on the reflective surface, within the relay lens, the linearly polarized light is circularly polarized with use of a ¼ wave retarder element. The material used for the retarder element is a stretched polymer which is sold by Nitto Japan and by Polotechnu also of Japan and a material sold by Farrand Optical New York. The purpose of circularly polarizing the light is to effect a 90 degree rotation of the polarization direction between the light leaving the transmitting/reflecting polarizing device 408, going to the mirror 416, and the light entering the transmitting/reflecting polarizing device 408, coming from the reflecting surface of the mirror 416. While ¼ wave retardation is used, use of ¾ wave retardation or any multiple which will result in a 90 degree rotation of the polarization direction as previously explained may be used.

The relay lens 414 can be thought of as consisting of two halves "folded" about a reflecting surface 416. The first half roughly collimates the image and the second half reforms the image. Within the relay lens 414 first half, a pupil is formed at or near the reflecting surface. This internal pupil in combination with the second half of the relay lens and the eyepiece will be reimaged as a real exit pupil forming to form the viewing area. The detailed geometric requirements of forming the conjugate pupil and correcting the aberrations are well known to those skilled in the art of lens design. However, the overview is to re-image the internal pupil at the viewing area while re-imaging the aerial image at or near infinity. Thus the solution is to place the aerial image at the focus of the eyepiece and to place the pupil, within the relay, at a greater distance from the eyepiece typically two times the eyepiece focal length.

Figure 5:
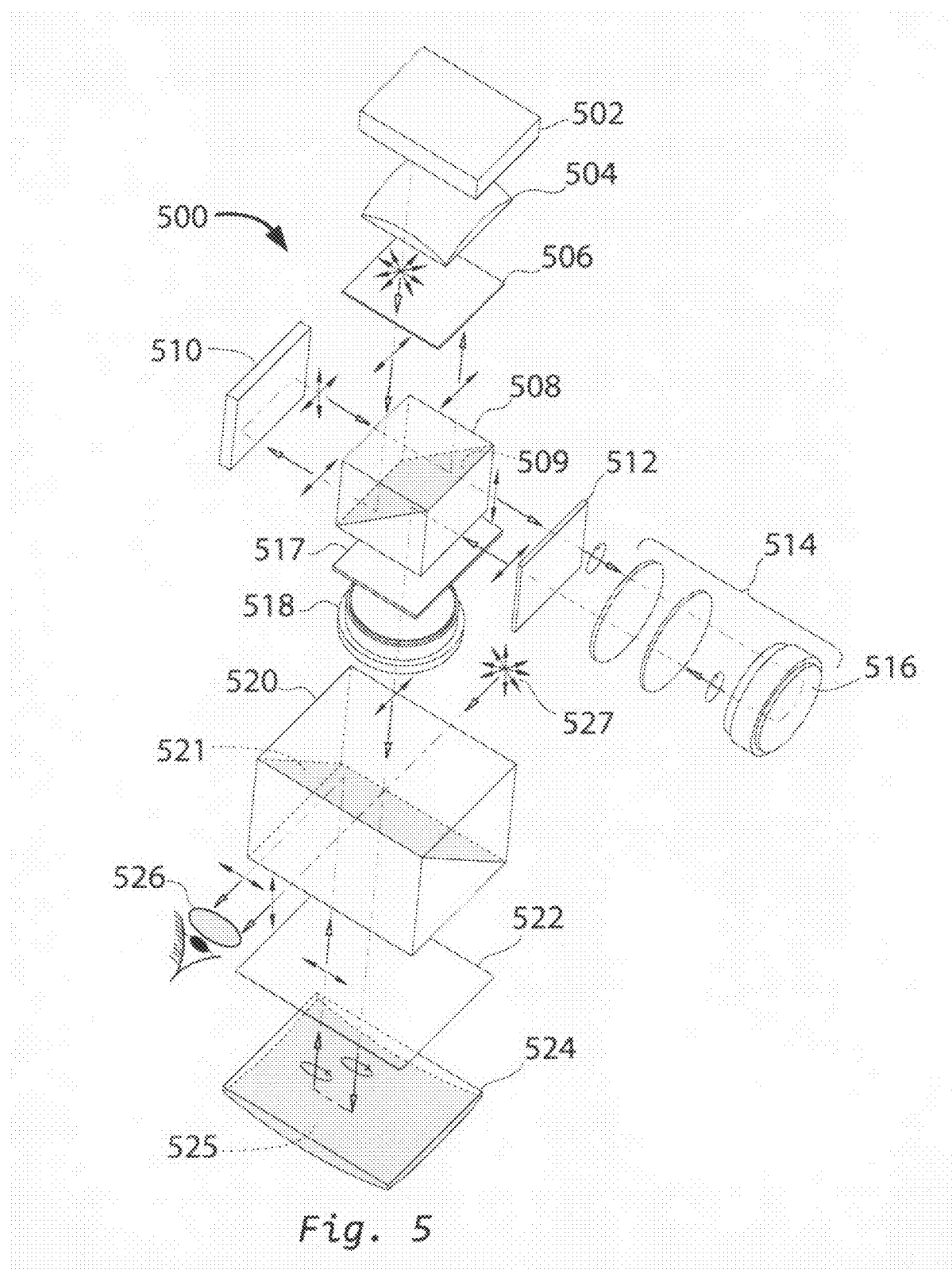
FIG. 5 illustrates a preferred embodiment of an optical system with multiple paths within one or more elements of a compact optical system.

Optical system 500 of FIG. 5 illustrates the light path of a preferred embodiment of the claimed optical system. A light source 502 emits light that passes through an illumination lens 504. The light is then "s" polarized by polarizer 506. The "s" polarized light enters a transmitting/reflecting polarizing device 508 and is incident on the beam splitter coating such that the "s" polarized light is reflected by the polarizing surface 509. The light exits the transmitting/reflecting polarizing device 508 and is incident to SLM 510. The light is accepted, reflected, and coded by SLM 510 on a pixel by pixel basis and the light from each pixel exits the SLM 510 as ether "s" or "p" polarized light. The light then returns to the transmitting/reflecting polarizing device 508 and is again incident on polarizing surface 509. The portion of the light that is "s" polarized is reflected towards the light source 502. The portion of the light that is "p" polarized passes through 509 and exits the transmitting/reflecting polarizing device 508. The "p" polarized light continues to a ¼ wave retarder 512 which circularly polarizes the incident linearly polarized light with preference to handedness (right-handedness or clockwise; left-handedness or counter-clockwise). The light then passes through a relay lens 514 and is incident on a first Mangin reflecting surface 516 that reverses the direction of light and reverses the handedness of the circular polarization. The light travels back through the relay lens 514, and passes through the ¼ wave retarder 512, which now converts the circularly polarized light into "s" linearly polarized light. The light then reenters the transmitting/reflecting polarizing device 508 and continues to the polarizing surface 509 which reflects the "s" polarized light. The light exits the transmitting/reflecting polarizing device 508 and is received by a field lens 518. The light passes through the field lens 518 and is incident upon a second transmitting/reflecting polarizing device 520 with its polarizing beam splitting surface 521 rotated 90 degrees about propagation vector of the incident light with respect to the prior polarizing beam splitting surface 509 for passing the incident polarized light. The light then exits the second transmitting/reflecting polarizing device 520, and is incident on a second ¼ wave retarder 522 which circularly polarizes the light with preference to handedness (right or left). The light then enters lens 524, and is reflected by a second Mangin surface 525 which reverses the direction of propagation of light and also reverses the handedness (left or right) of the circularly polarized light. The circularly polarized light is returned to the second ¼ wave retarder 522 which converts the light into linearly polarized light with polarization direction orthogonal to the one that first entered the second ¼ wave retarder 522. The light then again enters the second transmitting/reflecting polarizing device 520, this time to be reflected by the second polarizing beam splitter surface 521. Exiting the second transmitting/reflecting polarizing device 520, the light forms real exit pupil 526 for observing the collimated virtual image at or near infinity. Randomly polarized light 527 enters the optical system through the second transmitting/reflecting polarizing device 520. When incident on the second polarizing beam splitter surface 521 the light is polarized into two orthogonal directions. One orthogonal polarized light component is directed towards field lens 518 and the other orthogonal polarized light component continues toward real exit pupil 526 for viewing.

As discussed above, the first transmitting/reflecting polarizing device 508 and/or the second transmitting/reflecting polarizing device 520 may be PBS cube or wire grid polarizing flat plate type to accomplish all the functions of the beam splitting surfaces 509 and/or 521.

Figure 6:
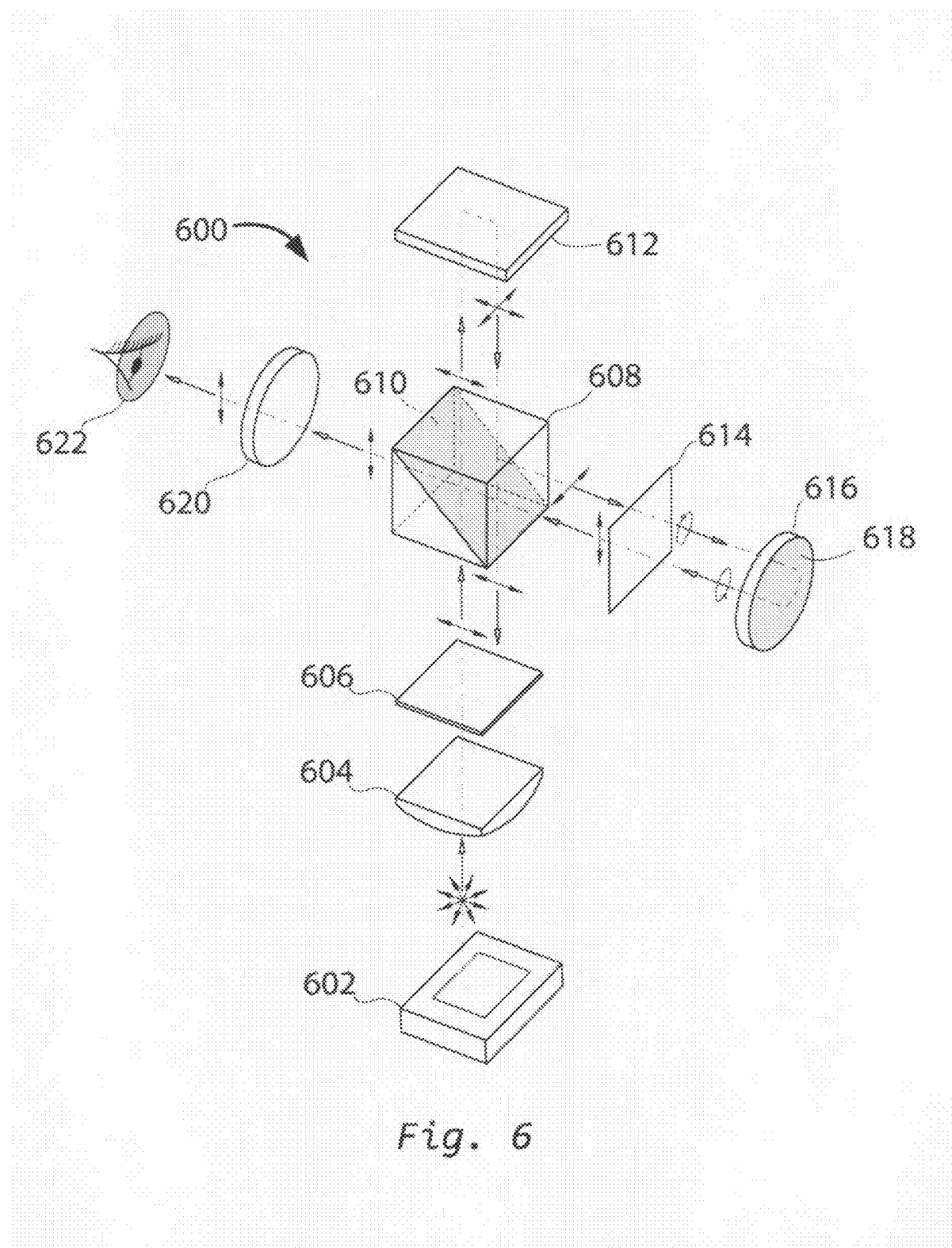
FIG. 6 illustrates another embodiment of an optical system with multiple paths within one or more elements of a compact optical system.

FIG. 6 illustrates the light path of another embodiment 600 of the system. In this embodiment a light source 602 emits light which passes through illumination lens 604 and is polarized by a linear polarizer 606 such that "p" polarized light enters a transmitting/reflecting polarizing device 608. The light passes through the beam splitter coating 610 and exits the transmitting/reflecting polarizing device 608 on the side opposite the light source 602. The light is then incident on the SLM 612. The light is accepted, reflected and coded by the SLM 612 on a pixel by pixel basis forming an image. The light from each pixel exits the SLM 612 as either "s" or "p" polarized light. The light returns to the transmitting/reflecting polarizing device 608 and is incident on the beam splitter coating surface 610 where the light coded as "p" polarized light passes through while light coded as "s" is redirected by reflection. The redirected "s" polarized light exits the transmitting/reflecting polarizing device 608 and passes through a ¼ wave plate 614 which circularly polarizes the light with preference to handedness (right or left). The light then continues into a relay lens 616 and encounters a Mangin mirror 618 which reverses the direction of propagation of light and also reverses the handedness (left or right) of the circularly polarized light. The circularly polarized light then passes through the relay lens 616 in a reversed direction, exits relay lens 616 and passes through the ¼ wave plate 614 which now converts the circularly polarized light to "p" linearly polarized light. The light reenters the transmitting/reflecting polarizing device 608 and is incident on the beam splitting surface 610 which passes the "p" polarized light. The light exits the transmitting/reflecting polarizing device 608 opposite the relay lens 616 and continues to eyepiece 620. The eyepiece collimates the light and forms a real exit pupil 622 for viewing the virtual image at or near infinity. As discussed above, transmitting/reflecting polarizing device 608 can be a polarizing flat plate or a PBS cube to accomplish all the functions of the beam splitting surface 610.

Figure 7:
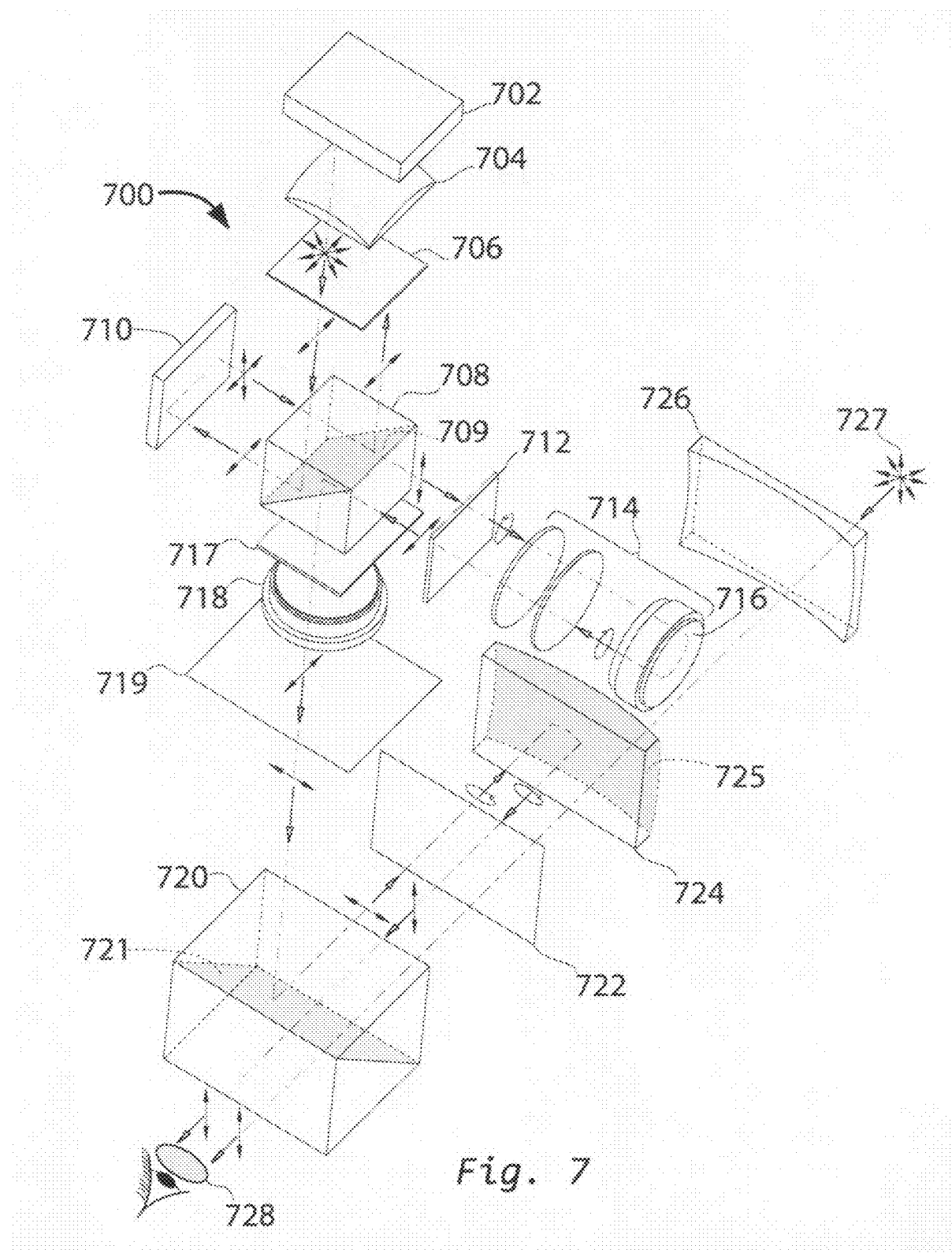
FIG. 7 illustrates another embodiment of an optical system with multiple paths within one or more of a compact optical system.

FIG. 7 illustrates the light path of another embodiment 700 of the system. A light source 702 emits light that passes through an illumination lens 704. The light is then "s" polarized by polarizer 706. The "s" polarized light enters a first transmitting/reflecting polarizing device 708 and is incident on a first beam splitter coating 709. The coating is such that the "s" polarized light is reflected by the coating. The light exits the first transmitting/reflecting polarizing device 708 and is incident on the SLM 710. The light is accepted, reflected, and coded by the SLM 710 on a pixel by pixel basis and the light from each pixel exits the SLM 710 as either "s" or "p" polarized light. The light then returns to the first transmitting/reflecting polarizing device 708 and is again incident on the first beam splitter coating 709. The portion of the light that is "s" polarized is reflected towards the light source 702. The portion of the light that is "p" polarized passes through beam splitting coating 709 and again exits the first transmitting/reflecting polarizing device 708. The "p" polarized light continues to a first ¼ wave retarder 712 which circularly polarizes the light with preference to handedness (right or left). The light then passes through a first relay lens 714 and is incident on a first Mangin reflecting surface 716 which reverses the direction of propagation of light and also reverses the handedness (left or right) of the circularly polarized light. The light is directed back through the first relay lens 714 by the first Mangin reflecting surface 716, and then passes through the first ¼ wave retarder 712 which now converts the circularly polarized light to "s" polarized light. The light then reenters the first transmitting/reflecting polarizing device 708 and again continues to the beam splitter coating 709 which reflects the "s" polarized light. The light exits the first transmitting/reflecting polarizing device 708 and is received by a field lens 718. The light passes through the field lens 718 and is incident on a ½ wave plate 719, which causes the polarization direction to rotate 90 degrees.

The light then enters a second transmitting/reflecting polarizing device 720 with the second beam splitting surface 721 rotated 90 degrees about propagation vector of the incident light with respect to the prior beam splitting surface 709 so that the incident linearly polarized light is reflected by the beam splitting surface 721 towards a second ¼ wave retarder 722. The light is then incident on the second ¼ wave retarder 722 and is circularly polarized with preference to handedness (right or left). The light then enters lens 724, is partially reflected by a second Mangin reflecting surface 725 which also reverses the handedness of the circularly polarized light. The circularly polarized light is returned to the second ¼ wave retarder 722 which converts the light to linearly polarized light with polarization direction orthogonal to the one that first entered the second ¼ wave retarder 722. The light reenters the second transmitting/reflecting polarizing device 720 and is transmitted by beam splitter surface 721. Exiting the second transmitting/reflecting polarizing device 720, the light forms real exit pupil 728 for observing the collimated virtual image at or near infinity.

Randomly polarized light (outside system light) 727 enters the optical system through lens 726 which has an equal and opposite power as that of lens 724. The outside system light then enters lens 724 through the partially transmitting second Mangin reflecting surface 725 and continues through the second ¼ wave retarder 722. The outside system light then enters the second transmitting/reflecting polarizing device 720. When incident on the beam splitting surface 721, the outside system light is linearly polarized into two orthogonal directions. One orthogonal linearly polarized light component is directed towards a ½ wave plate 719. The second orthogonal linearly polarized component continues toward the real exit pupil 728 for viewing.

As discussed above, the transmitting/reflecting polarizing device 708 and/or the transmitting/reflecting polarizing device 720 may be a polarizing flat plate or a PBS cube to accomplish all the functions of the beam splitting surfaces 709 and/or 721.

Figure 8:
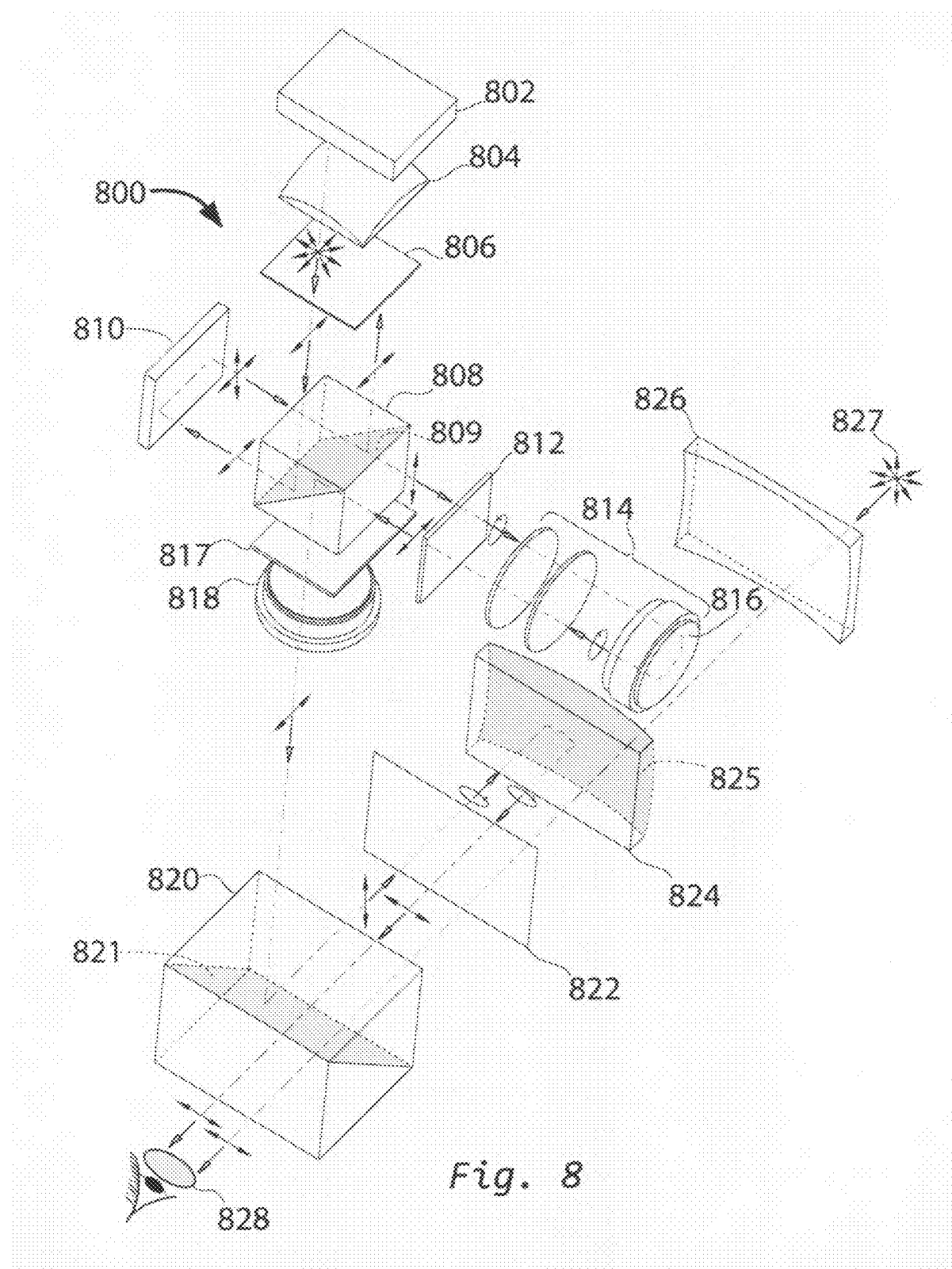
FIG. 8 illustrates another embodiment of an optical system with multiple paths within one or more elements of a compact optical system.

FIG. 8 illustrates the light path of an embodiment 800 very similar to the embodiment 700 of FIG. 7 described above. The main difference is in the use of polarization. A light source 802 emits light that passes through an illumination lens 804. The light is then "s" polarized by polarizer 806. The "s" polarized light enters a first transmitting/reflecting polarizing device 808 and is incident on a first beam splitter coating 809. The coating is such that the "s" polarized light is reflected by the beam splitter coating 809 surface. The light exits the first transmitting/reflecting polarizing device 808 and is incident on the SLM 810. The light is accepted, reflected, and coded by the SLM 810 on a pixel by pixel basis and the light from each pixel exits the SLM 810 as either "s" or "p" polarized light. The light then returns to first transmitting/reflecting polarizing device 808 and is again incident on the first beam splitter coating 809. The portion of the light that is "s" polarized is reflected towards the light source 802. The portion of the light that is "p" polarized passes through the beam splitting coating 809 and again exits the first transmitting/reflecting polarizing device 808. The "p" polarized light continues to a first ¼ wave retarder 812 which circularly polarizes the light with preference to handedness (right or left). The light then passes through a first relay lens 814 and is incident on a first Mangin reflecting surface 816 which reverses the direction of propagation of light and also reverses the handedness (left or right) of the circularly polarized light. The light is then directed back through the relay lens 814 by Mangin reflecting surface 816, and then passes through the ¼ wave retarder 812 which now converts the circularly polarized light to "s" polarized light. The light then reenters the first transmitting/reflecting polarizing device 808 and continues to the first beam splitter coating 809 which reflects the "s" polarized light. The light exits first transmitting/reflecting polarizing device 808 and is received by field lens 818. The light passes through field lens 818 and enters a second transmitting/reflecting polarizing device 820 with a second beam splitting surface 821 rotated 90 degrees about propagation vector of the incident light with respect to the prior beam splitting surface 809 so that the incident linearly polarized light is reflected by the beam splitting surface 821 towards a second ¼ wave retarder 822. The light is then incident on the second ¼ wave retarder 822 and is circularly polarized with preference to handedness (right or left). The light then enters lens 824, is partially reflected by a second Mangin reflecting surface 825 which also reverses the handedness of the circularly polarized light. The circularly polarized light is returned to the second ¼ wave retarder 822 which converts the light to linearly polarized light with polarization direction orthogonal to the one that first entered the second ¼ wave retarder 822. The light reenters the transmitting/reflecting polarizing device 820 and is transmitted by the beam splitter surface 821. Exiting the second transmitting/reflecting polarizing device 820, the light forms real exit pupil 828 for observing the collimated virtual image at or near infinity.

Randomly polarized light (outside system light) 827 enters the optical system through lens 826 which has an equal and opposite power as that of lens 824. The light then enters lens 824 through the partially transmitting second Mangin reflecting surface 825 and continues through to the second ¼ wave retarder 822. The light then enters the second transmitting/reflecting polarizing device 820. When the outside system light is incident on the second beam splitting surface 821, the light is linearly polarized into two orthogonal directions. One orthogonal linearly polarized light component is directed towards the field lens 818. The second orthogonal linearly polarized component continues toward real exit pupil 828 for viewing. As discussed above, the transmitting/reflecting polarizing device 808 and/or the transmitting/reflecting polarizing device 820 can be replaced by a polarizing flat plate or PBS cube to accomplish all the functions of the beam splitting surfaces 809 and/or 821.

The schematic arrangement illustrated by FIG. 4 and the embodiments illustrated in FIGS. 5, 6, 7, and 8 have the unique feature of having a total length, width and height dimension substantially less than the total optical length from the light source to the viewing area. Such a feature in a compact optical system permits smaller head mounted displays and reduces the weight of such displays.

The foregoing is provided for the purpose of illustrating, explaining and describing embodiments of the present disclosure. Further modifications and adaptations to these embodiments will be apparent to those skilled in the art and may be made without departing from the spirit of the disclosure or the scope of the following claims.

We claim:

1. A compact pupil forming optical system wherein a sum of a length, a width and a height of said optical system is less than an optical path length traversing through or reflecting from a plurality of elements of the optical system, wherein optical system comprising a plurality of elements including:
   a light source;
   an illumination lens;
   one or more polarizers;
   one or more transmitting/reflecting polarizing device(s);
   a spatial light modulator;
   one more relay lens(es);
   one or more first surface or Mangin mirrors;
   an eyepiece; and
   having a real external exit pupil from which a virtual image is observed,
   wherein said optical system uses linearly polarized light outside said one or more relay lenses and circularly polarized light within said one or more relay lenses, or a portion of said one or more relay lenses, thus enabling different optical paths for light entering and exiting said one or more relay lenses,
   said light source emitting light that passes through said illumination lens;
   said light is polarized by said first linear polarizer;
   said polarized light is incident to said first transmitting/reflecting polarizing device; said first transmission/reflection polarizing device being substantially tilted to direction of the light by 90 degrees;
   a portion of said polarized light is reflected by said first transmitting/reflecting polarizing device;
   said reflected polarized light is then incident to said spatial light modulator where it is accepted,
   reflected, and coded by said spatial light modulator on a pixel by pixel basis and exits said spatial light modulator as a first or second portion of linearly polarized light;
   said coded light is returned to said first transmitting/reflecting polarizing device;
   said second portion of linearly polarized light passes through said first transmitting/reflecting polarizing device;
   said second portion of linearly polarized light continues to said second polarizer, a ¼ wave retarder which circularly polarizes said second portion of polarized light;
   said circularly polarized light passes through said first relay lens and is incident to a first Mangin/reflecting surface;
   said first Mangin/reflecting surface directs said circularly polarized light back through said relay lens and said first ¼ wave retarder a second time which causes a polarization phase shift of 90 degrees; thus becoming said second portion of linearly polarized light;
   said second portion of linearly polarized light is then passed again to said first transmitting/reflecting polarizing device and is reflected by said first transmitting/reflecting polarizing device towards eyepiece: A second transmitting/reflecting polarizing device with its second beam splitting surface rotated around the direction of the light by substantially 90 degrees to the first beam splitting surface;
   said rotation between said first and second transmitting/reflecting polarizing devices causes a transposition of a polarization axis by 90 degrees thus causing the said second portion of linearly polarized light to be transmitted by second transmission/reflection device;
   said polarized light is then incident to said second transmission/reflection device and passes through and exiting said second transmitting/reflecting polarizing device;
   said second portion of linearly polarized light is then incident on said second ¼ wave retarder and is circularly polarized;
   said circularly polarized light then enters said eyepiece lens and is reflected by said second Mangin surface, and is returned to said second ¼ wave retarder which causes a rotation of a polarization axis by 90 degrees and said second portion of light becomes linearly polarized light;
   said second portion polarized light then enters said second transmitting/reflecting polarizing device and is reflected by said second transmissive/reflective polarizing surface;
   said reflected light exits said second transmitting/reflecting polarizing device;
   said exiting light is observed at said viewing area;

randomly polarized light outside system light enters said optical system through said second transmitting/reflecting polarizing device;

a portion of said randomly polarized outside system light is incident on said second transmitting/reflecting polarizing device;

said randomly polarized outside system light is linearly polarized into two orthogonal portions thus becoming first orthogonal portion and second orthogonal portion;

said first orthogonal portion of said linearly polarized light is directed towards said first transmitting/reflecting polarizing device;

said second orthogonal portion of said light continues to said viewing area by said eyepiece and thus observed by an eye in a viewing position area.

2. The optical system of claim 1 wherein said second portion of polarized light is "s" polarized light.

3. The optical system of claim 1 wherein said second portion of polarized light is "p" polarized light.

4. The optical system of claim 1 wherein said transmitting/reflecting polarizing device is a polarizing coated flat plate.

5. The optical system of claim 1 wherein said transmitting/reflecting polarizing device is a polarizing beam splitter cube.

6. The optical system of claim 1 wherein an additional polarizing element added between said first transmitting/reflection polarizing device and second transmitting/reflecting polarizing device.

* * * * *